United States Patent
Mizuno (10) Patent No.: US 8,291,413 B2
(45) Date of Patent: Oct. 16, 2012

(54) VIRTUAL COMPUTER SYSTEM MANAGING SCHEDULE FOR ALLOCATING CPU TO GUEST OSES AND GUEST OS SCHEDULING METHOD

(75) Inventor: Satoshi Mizuno, Hino (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 953 days.

(21) Appl. No.: 12/261,901

(22) Filed: Oct. 30, 2008

(65) Prior Publication Data

US 2009/0113426 A1  Apr. 30, 2009

(30) Foreign Application Priority Data

Oct. 31, 2007  (JP) ................. 2007-283721

(51) Int. Cl.
*G06F 9/455* (2006.01)
(52) U.S. Cl. .......................................................... 718/1
(58) Field of Classification Search ........................ 718/1
See application file for complete search history.

(56) References Cited

U.S. PATENT DOCUMENTS

| 7,415,708 B2 * | 8/2008 | Knauerhase et al. ............. 718/1 |
| 2008/0163211 A1 | 7/2008 | Mizuno |

FOREIGN PATENT DOCUMENTS

| JP | 9-26889 | 1/1997 |
| JP | 2003-177928 | 6/2003 |
| JP | 2005-115751 | 4/2005 |
| JP | 2007-58331 | 3/2007 |
| JP | 2007-66265 | 3/2007 |

OTHER PUBLICATIONS

Okazaki et al., "OS Series 11 VM," Kyoritsu Shuppan Co., Ltd. (Aug. 1989), pp. 97-100.
Takahashi, "Third Virtual machine Monitor Xen 3.0 Decoding Class, Domain Scheduling (1)," Open Source Magazine (Jun. 2006), pp. 161-170.
Takahashi, "Fourth Virtual Machine Monitor Xen 3.0 Decoding Class, Domain Scheduling (2)," Open Source Magazine (Jul. 2006), pp. 147-155.
Decision of Rejection issued by the Japanese Patent Office on Jul. 13, 2010, for Japanese Patent Application No. 2007-283721, and English-language translation thereof.
Notice of Reasons for Rejection issued by the Japanese Patent Office on Sep. 29, 2009, for Japanese Patent Application No. 2007-283721, and English-language translation thereof.

* cited by examiner

*Primary Examiner* — Eddie P Chan
*Assistant Examiner* — Benjamin Geib
(74) *Attorney, Agent, or Firm* — Finnegan, Henderson, Farabow, Garrett & Dunner, L.L.P.

(57) ABSTRACT

According to one embodiment, a virtual machine manager (VMM) virtualizes hardware including a CPU to construct a plurality of virtual machines. A plurality of guest OSes are executed on the respective virtual machines. A detector included in VMM detects a change in the operating frequency of CPU. A scheduler is included in VMM. If a change in operating frequency is detected, and the operating frequency decreases below a prescribed frequency, the scheduler performs scheduling so as to increase a time for which the CPU is to be allocated to one or more predetermined particular guest OSes of the plurality of guest OSes.

12 Claims, 7 Drawing Sheets

F I G. 1

| GOSN | ACTR (%) | CCTR (%) | |
|---|---|---|---|
| 0 | 20 | 40 | ~202 |
| 1 | 15 | 30 | |
| 2 | 10 | 20 | |
| 3 | 0 | 5 | |
| 4 | 0 | 5 | |
| | | | |

F I G. 2

F I G. 3  Allocation of CPU to guest OS #2

| GOSN | ACTR (%) | CCTR (%) | |
|---|---|---|---|
| 0 | 20 | 20 | ~202 |
| 1 | 15 | 15 | |
| 2 | 10 | 10 | |
| 3 | 0 | 27.5 | |
| 4 | 0 | 27.5 | |
| | | | |

FIG. 7A $\tau = 5$ [ms], CCTR = 27.5 [%], Nd = 55

FIG. 7B $\tau = 5$ [ms], CCTR = 5 [%], Nd = 10

FIG. 7C $\tau = 2.5$ [ms], CCTR = 5 [%], Nd = 20

| GOSN | GOSP | ACTR[%] | CCTR[%] | AF | FF |
|------|------|---------|---------|-----|-----|
| 0 | 7 | 20 | 20 | 1 | 0 |
| 1 | 6 | 15 | 15 | 1 | 0 |
| 2 | 5 | 10 | 10 | 1 | 0 |
| 3 | 0 | 0 | 27.5 | 0 | 0 |
| 4 | 0 | 0 | 27.5 | 0 | 0 |
|  |  |  |  |  |  |

| GOSN | GOSP | ACTR[%] | CCTR[%] | AF | FF |
|---|---|---|---|---|---|
| 0 | 7 | 20 | 40 | 1 | 0 |
| 1 | 6 | 15 | 30 | 1 | 0 |
| 2 | 5 | 10 | 10 | 1 | 1 |
| 3 | 0 | 0 | 10 | 0 | 0 |
| 4 | 0 | 0 | 10 | 0 | 0 |
|  |  |  |  |  |  |

FIG. 10

VIRTUAL COMPUTER SYSTEM MANAGING SCHEDULE FOR ALLOCATING CPU TO GUEST OSES AND GUEST OS SCHEDULING METHOD

CROSS-REFERENCE TO RELATED APPLICATIONS

This application is based upon and claims the benefit of priority from prior Japanese Patent Application No. 2007-283721, filed Oct. 31, 2007, the entire contents of which are incorporated herein by reference.

BACKGROUND OF THE INVENTION

1. Field of the Invention

The present invention relates to a virtual computer system (virtual machine system) in which a plurality of virtual machines (virtual computers) operate, and in particular, to a virtual computer system suitable for managing a schedule for allocating a CPU, in a time-sharing manner, to a plurality of guest OSes (guest operating systems) executed in the respective virtual machines, as well as a guest OS scheduling method.

2. Description of the Related Art

A virtual computer system is conventionally known which is implemented in a main frame using a virtual machine support system. The virtual machine assisted system is composed of hardware (HW). In recent years, the CPU (processor) in a personal computer (PC), which is included in HW, has supported a virtual machine support system similar to that in the main frame. Thus, even in the field of PCs, a main frame virtualization technology has been utilized. Thus, the virtualization technology (that is, the technology for virtual machines) is expected to be commonly used in PCs (PCs for individual use), PC servers, etc.

In general, a computer system such as a PC, that is, a physical machine (real computer), is composed of HW (real HW) including a CPU (real CPU), various I/O devices (real I/O devices), and a memory (real memory). A virtual machine manager (VMM) operates on the physical machine, composed of the real HW. The virtual machine manager provides a virtual machine execution environment in which a plurality of guest OSes operate.

The virtual machine manager is also called a virtual machine monitor. The virtual machine manager directly manages and virtualizes the above-described elements of the real HW to construct virtual machines. That is, the virtual machine manager constructs (generates) the virtual machines by temporally and/or spatially (regionally) allocating physical resources (HW resources) such as the real CPU, the real I/O devices, and the real memory to each of the virtual machines as a virtual CPU, virtual I/O devices, and a virtual memory. The guest OSes are loaded into the respective virtual machines and executed by the virtual CPUs in the respective virtual machines.

In this manner, the virtual machine manager provides an environment in which the guest OSes can operate simultaneously, by performing what is called guest OS scheduling in which the physical resources such as the real CPU, the real I/O devices, and the real memory are allocated to the guest OSes. That is, the virtual machine manager can manage the virtual computer system to operate the plurality of guest OSes for a particular purpose. This is a significant advantage over the conventional non-virtual computer system. However, appropriate improvements are required to allow the plurality of guest OSes to share the physical resources (HW resources) in the virtual computer system, particularly to implement real time (RT) processing.

The real time processing is temporally limited in that particular processing needs to be completed beforehand within a predetermined time. Thus, a real time OS (RTOS) is generally used as an OS (Operating System) in order to implement the real time processing. The real time OS performs priority management suitable for the real time processing in connection of the execution of an application program (process) on OS.

The real time OS is implemented so as to have a real time property. Thus, the real time OS ensures the temporal accuracy of a dispatch process of allocating a CPU to the above-described application program (real time application), responsiveness to an interruption, and the like. On the real time OS, the application programs run on the assumption that the real time property has been realized. Thus, the application program running on the real time OS can be used for, for example, severely temporally restricted control applications.

A case is assumed in which the above-described real time OS and the above-described application program, which requires the real time property, are executed on the virtual machine. In the virtual machine, a CPU is allocated to each of the guest OSes in a time-sharing manner. However, for a normal real time OS and a real time application program running on the OS, the time required for time management and processing is estimated on the assumption that the CPU is always allocated for the execution of the program.

To allow the real time OS and the real time application program running on the OS to be executed on the virtual machine, a CPU may be accurately allocated to the program at a given period for a given time. This makes the throughput for the program per unit time constant, allowing the real time property to be easily designed (estimated). That is, the real time property can be realized during the execution of the real time OS and the application program.

Technologies for general quest OS scheduling in the virtual computer system are described in Tokio Okazaki, Minoru Zensaki, "OS Series 11 VM" KYORITSU SHUPPAN CO., LTD., August 1989, p. 97 to 100 (hereinafter referred to as Document 1), Hirokazu Takahashi, "Third Virtual Machine Monitor Xen 3.0 Decoding Class, Domain Scheduling (1)", Open Source Magazine, June 2006, SOFTBANK Creative Corp., Ltd., p. 161 to 170 (hereinafter referred to as Document 2), and Hirokazu Takahashi, "Fourth Virtual Machine Monitor Xen 3.0 Decoding Class, Domain Scheduling (2)", Open Source Magazine, July 2006, SOFTBANK Creative Corp., Ltd., p. 147 to 155 (hereinafter referred to as Document 3).

For example, Document 1 describes a dispatch technology for allocating a CPU to the virtual machines. Document 1 discloses a "time slice quantum", which is a unit in which a CPU is allocated. Document 1 also introduces a CPU allocation policy as a virtualization technology applied to general-purpose computers. Specifically, Document 1 discloses CPU allocation with terminal inputs from interactive users and non-interactive users taken into account. Documents 2 and 3 disclose a dispatcher and scheduling provided by virtualization software "Xen". These documents describe a deadline-based scheduler policy called a "sefd scheduler".

Thus, Documents 1 to 3 describe examples of a method of allocating a CPU to a plurality of guest OSes (that is, a guest OS scheduling method). The conventional guest OS scheduling methods described in Documents 1 to 3 are different from one another owing to the intended use of the virtual machines to be subjected to scheduling. However, these guest OS scheduling methods are the same in that the scheduler or dispatcher in the virtual machine manager allocates a CPU time to the plurality of guest OSes.

Recent CPUs are configured to vary an operating frequency depending on the situation. In a typical case, if the temperature of a CPU or a system (computer system) including a CPU increases abnormally, the operating frequency of the CPU (or a system including a CPU) is automatically reduced. Thus, the reduced operating frequency reduces the power consumption of the CPU and the system, enabling a rise in temperature to be stopped. Furthermore, software (SW) such as an OS is configured to, for example, instruct (set) the HW, which determines the operating frequency of the CPU, to reduce the operating frequency. This enables a reduction in the power consumption of the CPU and the system, allowing possible useless power consumption to be avoided. Of course, if the temperature lowers, the operating frequency of the CPU is returned to the original level automatically or in response to an instruction from the SW. Similarly, if a load increases, the operating frequency of the CPU is returned to the original level in response to an instruction from the SW.

However, a change in the operating frequency of a CPU (or the system including CPU) affects the throughput of the CPU. For example, a decrease in the operating frequency of a CPU generally reduces the throughput of the CPU. Such a change in the operating frequency of a CPU is very inconvenient for the real time OS and the real time application program running on the OS, which pre-estimate the time required for processing and expect CPU to execute the processing as estimated based on the CPU's capabilities. That is, a change in the operating frequency of a CPU is a factor causing an error in processing time. Thus, the real time processing with the time ensured is difficult to achieve.

BRIEF SUMMARY OF THE INVENTION

One embodiment of the present invention provides a virtual computer system comprising: hardware including CPU; and a virtual machine manager configured to virtualize the hardware to construct a plurality of virtual machines and to manage the plurality of virtual machines such that the plurality of virtual machines execute a plurality of guest OSes, wherein the virtual machine manager includes: a detector configured to detect a change in an operating frequency of the CPU; a scheduler configured to manage a schedule for allocating the CPU to the plurality of guest OSes in a time-sharing manner, the scheduler being configured such that if the detector detects a change in the operating frequency and the operating frequency decreases below a predetermined prescribed frequency, the scheduler increases a time for which the CPU is to be allocated to one or more predetermined particular guest OSes of the plurality of guest OSes; and a dispatcher configured to allocate the CPU to the plurality of guest OSes in a time-sharing manner according to the schedule managed by the scheduler.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
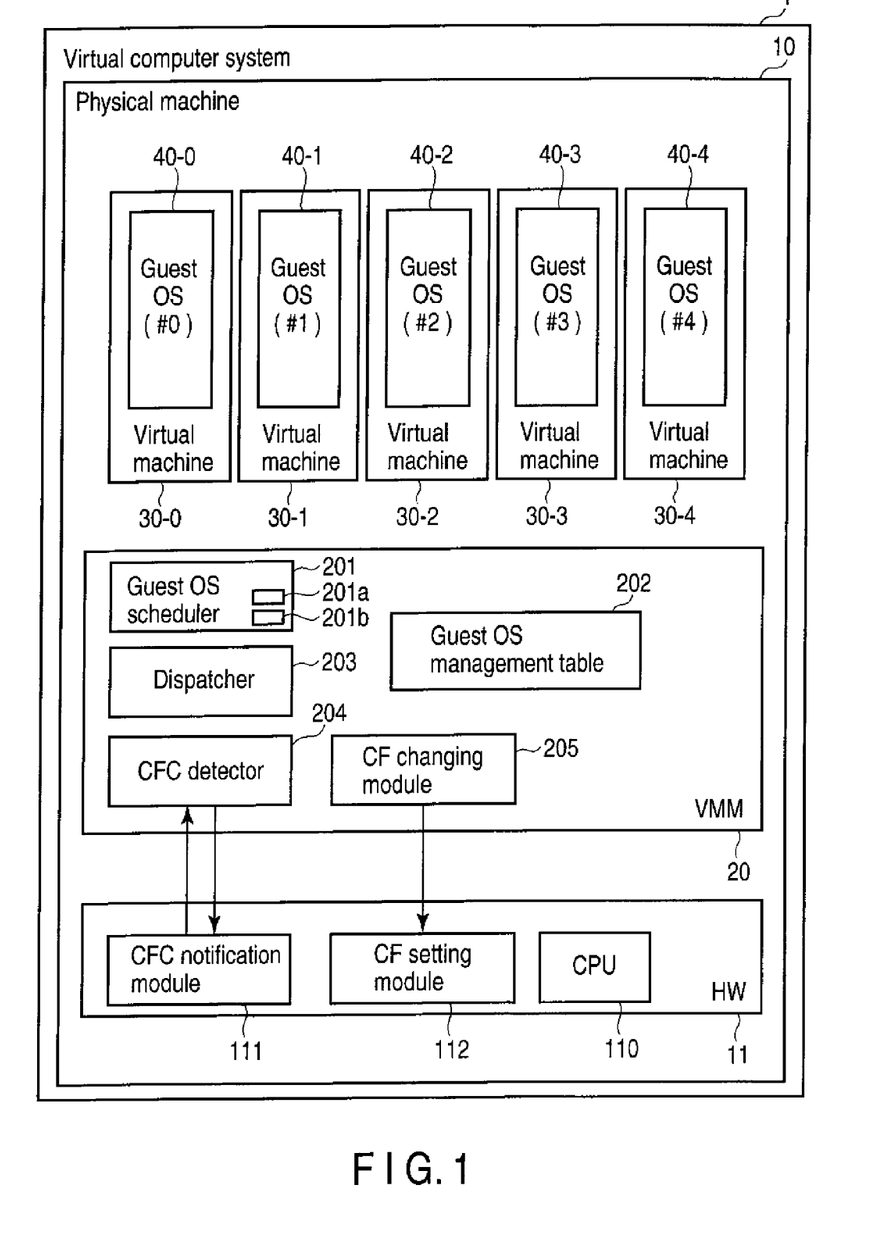
FIG. 1 is a block diagram showing an exemplary configuration of a virtual computer system according to an embodiment of the present invention.

FIG. 1 is a block diagram showing the configuration of a virtual computer system according to an embodiment of the present invention. The virtual computer system 1 shown in FIG. 1 is implemented using a physical machine 10. The physical machine 10 comprises hardware (HW) 11 providing an execution environment for virtual machines (virtual computers). HW 11 includes a CPU (real CPU) 110, and various I/O devices (real I/O devices) and a memory (real memory), which are not shown in the drawings.

A virtual machine manger (VMM) 20 operates on HW 11 of the physical machine 10. VMM 20 manages the virtual computer system 1 to provide an environment (virtual machine execution environment) in which virtual machines operate. Specifically, VMM 20 manages physical resources (including CPU 110) constituting HW 11 of the physical machine 10 as well as the temporal and regional allocation of the physical resources. According to this management, VMM 20 provides the virtual machine execution environment in which a plurality of virtual machines, for example, five virtual machines (VMs) 30-0, 30-1, 30-2, 30-3, and 30-4 operate. Each of VMs 30-0 to 30-4 is constructed by causing VMM 20 to temporally and regionally allocate the physical resources (including CPU 110) constituting HW 11 of the physical machine 1.

Guest OSes 40-0(#0), 40-1(#1), 40-2(#2), 40-3(#3), and 40-4(#4) operate on VMs 30-0, 30-1, 30-2, 30-3, and 30-4, respectively. More specifically, the guest OSes 40-0 to 40-4 are loaded into the respective VMs 30-0 to 30-4 and executed by the virtual CPUs in VMs 30-0 to 30-4. Guest OS numbers 0 to 4 are assigned to the respective guest OSes 40-0 to 40-4.

VMM 20 includes a guest OS scheduler 201, a guest OS management table 202, a dispatcher 203, a CPU frequency change detector (hereinafter referred to as a CFC detector) 204, and a CPU-frequency changing module (hereinafter referred to as a CF changing module) 205.

The guest OS scheduler 201 is started at an appropriate timing to calculate and determine a time ratio in which CPU 110 is allocated to each of the guest OSes managed by VMM 20 (in this case, the guest OSes 40-0 to 40-4). In the present embodiment, the appropriate timing is the point in time when a factor 1 or 2 described below occurs.

The quest OS management table 202 is used to hold the ratio (CPU time ratio) of the time (CPU time) which has been determined by the guest OS scheduler 201 and for which CPU 110 is to be allocated to each of the guest OSes. The CPU time ratio determined for each of the guest OSes by the guest OS scheduler 201 is called a current CPU time ratio. The current CPU time ratio indicates the throughput of CPU 110 (CPU throughput) actually allocated to the corresponding guest OS for the operation of the guest OS.

The quest OS management table 202 is further used to ensure the CPU time ratio (hereinafter referred to as the absolute CPU time ratio) for each of the guest OSes which is required to ensure the real time performance of the guest OS if CPU 110 (HW 11 including CPU 110) operates at a prescribed operating frequency (prescribed CPU frequency). The absolute CPU time ratio indicates the ratio of the processing capability (throughput) of CPU 110 required to ensure the real time performance of the corresponding guest OS, to the total processing capability (throughput) of CPU 110.

Figure 2:
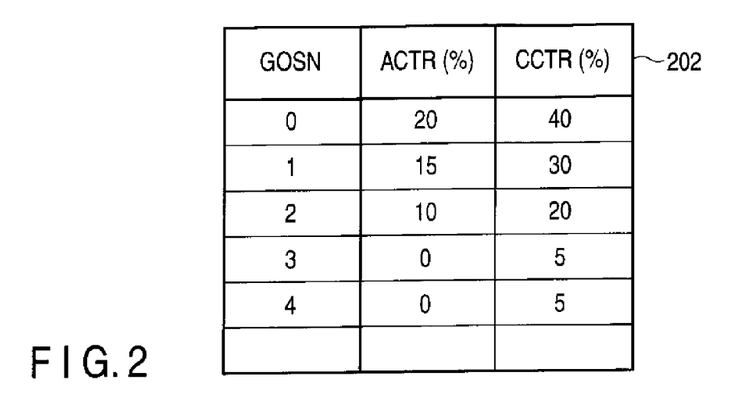
FIG. 2 is a diagram showing an example of a guest OS management table for the case in which the current CPU frequency is half of a prescribed frequency, the guest OS management table being applied to the embodiment.

FIG. 2 shows an example of the guest OS management table 202. Values indicating CPU time ratios of 40%, 30%, 20%, 5%, and 5% are held in the guest OS management table 202 shown in FIG. 2, as current CPU time ratios (CCTRs) for the guest OSes 40-0(#0), 40-1(#1), 40-2(#2), 40-3(#3), and 40-4(#4) with guest OS numbers (GOSNs) of 0, 1, 2, and 3, respectively. The current CPU time ratios of 40%, 30%, 20%, 5%, and 5% indicate the ratios, to the total time, of the time (CPU time) for which CPU 110 is allocated to the respective guest OSes 40-0(#0), 40-1(#1), 40-2(#2), 40-3(#3), and 40-4 (#4).

Furthermore, values of 20%, 15%, 10%, 0%, and 0% are held in the guest OS management table 202 shown in FIG. 2, as absolute CPU time ratios (ACTRs) for the guest OSes 40-0(#0), 40-1(#1), 40-2(#2), 40-3(#3), and 40-4(#4), respectively.

Referring back to FIG. 1, the dispatcher 203 executes a dispatch process of actually allocating CPU 110 to each of the guest OSes in accordance with the current CPU time ratio (that is, a schedule indicated by the guest OS management table 202) for the guest OS held in the guest OS management table 202. In the example of the guest OS management table 202 in FIG. 2, the dispatcher 203 allocates CPU 110 to the guest OSes 40-0(#0), 40-1(#1), 40-2(#2), 40-3(#3), and 40-4 (#4) in the ratio of 40%, 30%, 20%, 5% and 5%, respectively, in a time-sharing manner.

Figure 3:
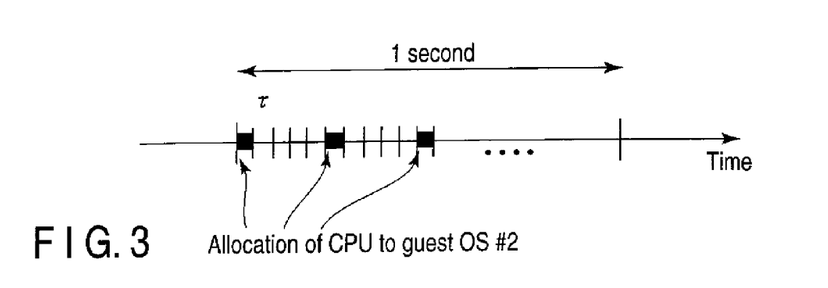
FIG. 3 is a diagram showing an example of a dispatch executed by a dispatcher shown in FIG. 1.

FIG. 3 shows an example of a dispatch performed by the dispatcher 203. In FIG. 3, the axis of abscissa indicates the elapse of time. In the present embodiment, the unit of the time for which CPU 110 is allocated to each of the guest OSes is constant. The time unit is called a "quantum", and is denoted by "τ". FIG. 3 shows an example in which CPU 110 (CPU time) is allocated to the guest OS 40-2(#2) with guest OS number 2 in the ratio of 20%. Here, the dispatcher 203 performs a dispatch on the guest 40-2(#2) for 1τ every 5τ to realize the ratio (CPU allocation ratio) of 20%. The dispatch process by the dispatcher 203 is similarly executed on the guest OSes other than the guest OS 40-2(#2). That is, the present embodiment repeats the process of passing control to the dispatcher 203 in VMM 20 every time (time unit) τ to select the guest OS to which CPU 110 (CPU time) is to be allocated during the next time (quantum).

In the present embodiment, HW 11 has a well-known CPU frequency automatic adjustment function of automatically reducing the operating frequency (CPU frequency) of CPU 110 when the temperature (that is, one of the operating environments of HW 11 including CPU 110) of HW 11 rises. Through this function of HW 11, the CFC detector 204 in VMM 20 detects a change in CPU frequency. Here, the CFC detector 204 detects a change in CPU frequency (current CPU frequency) on the basis of notification from a CFC notification module 111 in HW 11, described below.

The CF changing module 205 changes the CPU frequency (the operating frequency of CPU 110). Here, the CF changing module 205 performs the operation of changing the CPU frequency by setting the desired CPU frequency in a CF setting module 112 in HW 11, described below.

HW 11 includes a CPU-frequency change notification module (hereinafter referred to as a CFC notification module) 111 and a CPU-frequency setting module (hereinafter referred to as a CF setting module) 112. If the CPU frequency automatic adjustment function of HW 11 changes the CPU frequency, the CFC notification module 111 notifies the CFC detector 204 of the current CPU frequency. Here, the CFC notification module 111 notifies the CFC detector 204 of the change in CPU frequency by means of an interruption. In response to a query from the interrupted CFC detector 204, the CFC notification module 111 notifies the CFC detector 204 of the current CPU frequency. Furthermore, in response to a query from the CFC detector 204, the CFC notification module 111 notifies the CFC detector 204 of the current CPU frequency regardless of the change in CPU frequency, that is, regardless of the interruption to the CFC detector 204.

The CF setting module 112 is used by the CF changing module 205 to set the desired CPU frequency. The CF setting module 112 is composed of, for example, a register which can be accessed by the CF changing module 205. Setting the CPU frequency in the CF setting module 112 allows CPU 110 (or HW 11 including CPU 110) to operate at the set CPU frequency. The CFC notification module 111 and the CF setting module 112 may be contained in CPU 110.

Now, operations according to the present embodiment will be described. In the present embodiment, a particular guest OS 40-i(#i) (i is one of 0 to 4) to be pre-subjected to real time processing uses a system call dedicated for VMM 20 to request the absolute CPU time ratio to be allocated to the guest OS 40-i(#i) from VMM 20. Thus, the present invention provides a system call for an interface (interface function) call, shown below.

VMM_set_absolute_cpu_time(Cpu_Time_Rate);
When the guest OS 40-i invokes the interface function, the system call to VMM 20 is generated.

As described above, the absolute CPU time ratio is defined as a CPU time ratio (%) required to ensure the real time performance of the guest OS 40-i when CPU 110 operates at a prescribed frequency. That is, the absolute CPU time ratio is defined as a CPU time ratio (CPU throughput) required by the guest OS 40-i to operate at the prescribed frequency. In the present embodiment, the prescribed frequency (that is, the normal CPU frequency) is 1 Hz.

To ensure the real time performance, the guest OS 40-i is assumed to secure an absolute CPU time ratio corresponding to a CPU time (CPU throughput) amounting to 20% of the processing capability of CPU 110. Here, the processing capability of CPU 110 is the processing capability of CPU 110 exerted per unit time when CPU 110 operates at 1 GHz (prescribed frequency). In this case, the guest OS 40-i invokes the interface as follows to request the interface to allocate the absolute CPU time ratio (ACT=20).

VMM_set_absolute_cpu_time(20);

As shown in FIG. 1, the guest OS scheduler 201 has an allocation interface module 201a that provides the function of the interface.

When invoked by the system call from the guest OS 40-i using the above-described interface function, the allocation interface module 201a of the guest OS scheduler 201 accepts the request for allocation of the absolute CPU time ratio (here, 20%) indicated by an argument of the interface function. Then, the guest OS scheduler 201 enters the absolute CPU time ratio (ACTR=20) indicated by the argument into the guest OS management table 202 in association with the guest OS 40-i (the guest OS number i of the guest OS 40-i). Subsequently, when the CPU frequency changes, the guest OS scheduler 201 allocates CPU 110 to the guest OS 40-i in such a CPU time ratio (current CPU time ratio) as provides a CPU throughput (which offsets the change in CPU frequency) amounting to 20% of the processing capability of CPU 110 operating at the prescribed frequency.

The guest OS scheduler 201 allocates the CPU throughput (current CPU time ratio) to the guest OSes not having invoked the above-described interface function (system call), that is, the guest OSes not requesting the absolute CPU time ratio (non-requesting or non-particular guest OSes) as follows. First, the guest OS scheduler 201 calculates the remaining CPU throughout resulting from the allocation of the CPU throughput to the guest OSes having requested the absolute CPU time ratio (requesting or particular guest OSes). The guest OS scheduler 201 then equally divides the calculated remaining CPU throughput and allocates the equally divided CPU throughput to the non-requesting guest OSes as current CPU time ratios. In the guest OS management table 202, 0 is set in the section of the absolute CPU time ratio (ACTR) for the non-requesting guest OSes.

In the example of the guest OS management table 202 in FIG. 2, the requesting guest OSes (particular guest OSes) are the guest OSes 40-0, 40-1, and 40-2 with guest OS numbers 0, 1, and 2, respectively. The non-requesting guest OSes (non-particular guest OSes) are the guest OSes 40-3 and 40-4 with guest OS numbers 3 and 4, respectively. In this example, CPU 110 is allocated to the guest OSes 40-0, 40-1, and 40-2 in the CPU time ratio (current CPU time ratio) of 40%, 30% and 20%, which corresponds to the CPU throughput amounting to 20%, 15%, and 10%, respectively, of the processing capability of CPU 110 exhibited when CPU 110 operates at the prescribed frequency. In this case, the remaining CPU throughput is (100-(40+30+20))%, that is, 10%. Thus, CPU 110 is allocated to the guest OSes 40-3 and 40-4 in the CPU time ratio (current CPU time ratio) of 5%, that is, 10% equally divided by 2.

Now, scheduling processing executed when the CPU frequency changes according to the present embodiment will be described with reference to the flowchart in FIG. 4. The scheduling processing according to the flowchart in FIG. 4 is executed, for example, in the case where:

1) a rise in temperature causes the CPU frequency to decrease automatically to activate the CFC notification module 111 in HW 11, so that VMM 20 (the CFC detector 204 in VMM 20) is interrupted by the CFC notification module 111 (CFC interruption) (factor 1), or 2) VMM 20 determines that a system load has decreased or a user gives an appropriate instruction so that the CF changing module 205 in VMM 20 operates the CF setting module 112 in HW 11 to reduce the CPU frequency (factor 2).

Figure 4:
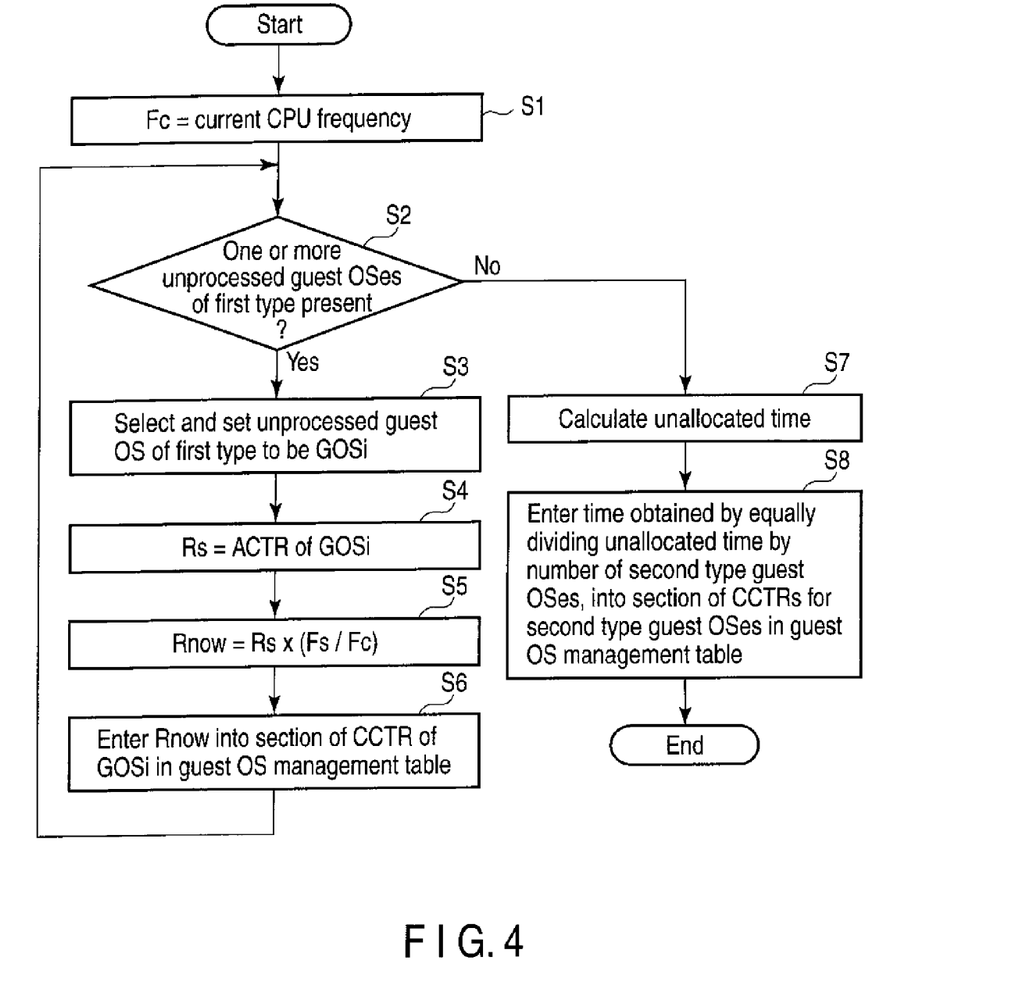
FIG. 4 is a flowchart showing an exemplary procedure of scheduling processing according to the embodiment.

If the CPU frequency is changed by these factors, the guest OS scheduler 201 in VMM 20 executes scheduling processing according to the flowchart in FIG. 4 on the requesting guests OSes and the non-requesting guest OSes. For the requesting guest OSes, the guest OS management table 202 shows that the absolute CPU time ratio is not zero; in the example in FIG. 2, the requesting guest OSes are the guest OSes 40-0, 40-1, and 40-2. For the non-requesting guest OSes, the guest OS management table 202 shows that the absolute CPU time ratio is zero; in the example in FIG. 2, the non-requesting guest OSes are the guest OSes 40-3 and 40-4.

First, the guest OS scheduler 201 sets the current value of the CPU frequency to be a variable Fc (step S1). The guest OS scheduler 201 acquires the current value of the CPU frequency from the CFC detector 204 as follows. In the above-described step S1, the guest OS scheduler 201 requests the CFC detector 204 to inquire of the CFC notification module 111 in HW 11 for the current CPU frequency (step S1). Thus, the CFC detector 204 inquires the CFC notification module 111 for the current CPU frequency. Then, the CFC notification module 111 notifies the CFC detector 204 of the current value of the CPU frequency. The CFC detector 204 passes the current value of the CPU frequency communicated by the CFC notification module 111 to the guest OS scheduler 201. The guest OS scheduler 201 acquires the current value of the CPU frequency in the above-described step S1.

Then, the quest OS scheduler 201 determines whether or not one or more unprocessed guest OSes are present in the set of the requesting guest OSes for which the absolute CPU time ratio is ensured (step S2). The requesting guest OSes for which the absolute CPU time ratio is ensured are hereinafter referred to as the first type quest OSes (or the guest OSes of the first type). The unprocessed guest OSes (that is, the unprocessed first type guest OSes or the unprocessed guest OSes of the first type) refer to the guest OSes to which the CPU time ratio has not been allocated.

In the present embodiment, the first type guest OSes are the guest OSes (requesting guest OSes) for which the guest OS management table 202 shows that the absolute CPU time ratio is not zero. Thus, with reference to the guest OS management table 202, the guest OS scheduler 201 can distinguish the first type guest OSes (the guest OSes for which the absolute CPU time ratio is ensured) from the guest OSes for which the absolute CPU time ratio need not be ensured (these guest OSes are hereinafter referred to as the second type guest OSes).

If one or more unprocessed guest OSes of the first type are present in the set of the first type guest OSes (if Yes in step S2), the guest OS scheduler 201 proceeds to step S3. In step S3, the guest OS scheduler 201 selects and sets an unprocessed guest OS of the first type to be GOSi (step S3).

Then, the guest OS scheduler 201 sets the absolute CPU time ratio (ACTR) entered into the guest OS management table 202 in association with GOSi to be a variable Rs (%) (step S4). The absolute CPU time ratio set to be the variable Rs (%) is specified for and required by GOSi. Obviously, when the prescribed frequency is defined as Fs, Rs denotes the CPU time ratio (the absolute throughput of CPU 110) required by GOSi at Fs per unit time.

Then, the guest OS scheduler 201 calculates the CPU time ratio (CPU throughput) Rnow required by GOSi at the current CPU frequency using the following equation (step S5).

$$Rnow = Rs \times (Fs/Fc) \quad (1)$$

That is, on the basis of the absolute CPU time ratio Rs, specified for GOSi, and the current CPU frequency Fc and the prescribed frequency Fs, the guest OS scheduler 201 calculates the CPU time ratio (CPU throughput) Rnow required by GOSi at the current CPU frequency Fc. Rnow indicates a CPU time ratio (CPU throughput) required to offset the amount by which the current CPU frequency Fc has decreased below the prescribed frequency Fs.

The guest OS scheduler 201 enters the calculated CPU time ratio (CPU throughput) Rnow into the section of the current CPU time ratio (CCTR) for GOSi in the guest OS management table 202 (step S6). That is, the quest OS scheduler 201 updates the value in the section of the current CPU time ratio (CCTR) associated with GOSi in the guest OS management table 202, to the calculated CPU time ratio (CPU throughput) Rnow.

In Formula (1), described above, the current CPU time ratio (CPU throughput) Rnow is calculated to be a value inversely proportional to a variation in CPU frequency. For example, if the current CPU frequency is half of the prescribed frequency Fs, the CPU time ratio Rnow, calculated according to Formula (1), is doubled. The guest OS management table 202 in FIG. 2 shows the current CPU time ratio (CCTR) for each guest OS used when the CPU frequency Fc is half (500 MHz) of the prescribed frequency Fs (1 GHz).

The guest OS scheduler 201 repeats the above-described process until no unprocessed guest OS of the first type is present in the set of the first type guest OSes (step S2). If no unprocessed guest OS of the first type is present (if No in step S2), the guest OS scheduler 201 proceeds to step S7. In step S7, the guest OS scheduler 201 calculates the sum ΣRnow (%) of the CPU time ratio (CPU throughput) Rnow allocated to all the first type guest OSes. In step S7, the guest OS scheduler 201 subtracts the calculated sum ΣRnow (%) from 100% to calculate the remaining CPU time ratio (CPU throughput), that is, the total CPU time ratio minus Rnow (%), to be an unallocated time (unallocated CPU throughput).

Then, the guest OS scheduler 201 equally divides the calculated unallocated time (in the unit of %) by dividing the calculated unallocated time by the number of the second type guest OSes, to obtain a time Rd (step S8). In step S8, the guest OS scheduler 201 enters the time Rd resulting from the equal division into the section of the current CPU time ratio (CCTR) for each of the second type guest OSes in the guest OS management table 202. That is, the guest OS scheduler 201 updates the value in the section of the current CPU time ratio (CCTR) associated with each of the second type guest OSes in the guest OS management table 202, to the time resulting from the equal division (unallocated CPU time ratio) Rd.

Thus, in step S8, the guest OS scheduler 201 allocates the time (CPU time ratio) Rd, into which the unallocated time (unallocated CPU time ratio) is equally divided, to the second type guest OSes. That is, the guest OS scheduler 201 equally allocates the unallocated time (unallocated CPU time ratio) to all the second type guest OSes. Upon executing step S8, the guest OS scheduler 201 completes the scheduling processing.

As described above, the guest OS management table 202 is updated by the scheduling processing, which is executed when the CPU frequency changes (decreases). Subsequently, the dispatcher 203 executes a dispatch process of allocating CPU 110 to the guest OSes 40-0 to 40-4 in accordance with the current CPU time ratio entered into the updated guest OS management table 202 in association with the guest OSes 40-0 to 40-4. Thus, if the CPU frequency is reduced by such a factor as a change in temperature, the CPU time (CPU throughput) offsetting the amount by which the CPU frequency has decreased is allocated to the first type guest OSes (in the example in FIG. 2, the guest OSes 40-0 to 40-2). As a result, even if the CPU frequency decreases below the prescribed frequency, the throughput per unit time (absolute throughput) for the first type guest OSes (guest OSes 40-0 to 40-2) is ensured to be constant. This allows the real time processing capability to be maintained for at least the first type guest OSes (particular guest OSes).

(First Modification)

According to the above-described embodiment, even when the CPU frequency decreases to, for example, half of the prescribed frequency, the decrease in CPU frequency can be prevented from affecting the execution efficiency of the first type quest OSes by doubling the CPU time ratio (CPU throughput) per unit time allocated to each of the first type guest OSes. However, the increase in CPU time ratio (CPU throughput) allocated to each of the first type guest OSes correspondingly reduces the CPU time (CPU throughput) that can be allocated to the second type guest OSes. This will be described citing a specific example.

Figure 5:
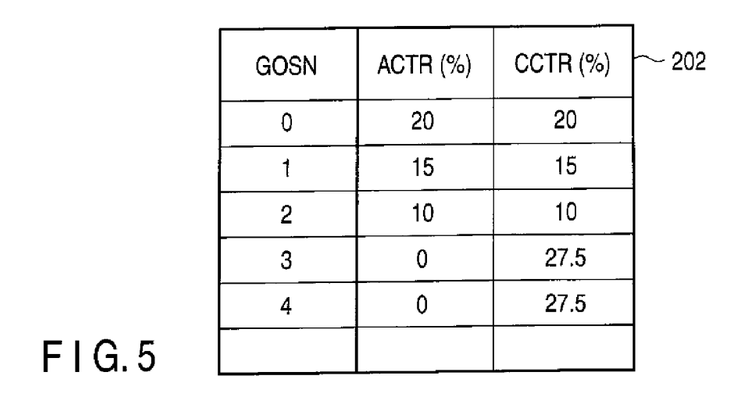
FIG. 5 is a diagram showing an example of a guest OS management table for the case in which the current CPU frequency is equal to the prescribed frequency.

FIG. 5 shows an example of the guest OS management table 202 in which the current CPU frequency is equal to the prescribed frequency. In the example, the current CPU time ratios (CCTRs) allocated to the first type guest OSes 40-0, 40-1, and 40-2 are equal to absolute CPU time ratios (ACTRs) of 20%, 15%, and 10%, respectively, as shown in FIG. 5. In this case, the total of the current CPU time ratios (CPU throughput) allocated to the first type guest OSes 40-0, 40-1, and 40-2 is 45%, and the remaining current CPU time ratio (surplus CPU throughput) is 55%. The current CPU time ratio of 55% is equally allocated to the second type guest OSes 40-3 and 40-4. Thus, the current CPU time ratio allocated to each of the second type guest OSes 40-3 and 40-4 is 27.5%, half of 55%, as shown in FIG. 5.

Here, as described above, the CPU frequency is assumed to decrease to half of the prescribed frequency, so that the current CPU time ratios allocated to the first type guest OSes 40-0, 40-1, and 40-2 are doubled, that is, increased from the values shown in FIG. 5 to the values shown in the example in FIG. 2. In this case, the current CPU time ratio (CPU time) allocated to each of the second type guest OSes is reduced from 27.5% to 5% (see FIG. 2). The change from 27.5% to 5% means that the number of quanta allocated to each of the second type guest OSes 40-3 and 40-4 per unit time decreases in proportion to the change rate, that is, to 5/27.5. As a result, for the second type guest OSes 40-3 and 40-4, dispatch opportunities decrease, which affects response time.

Thus, a first modification of the above-described embodiment will be described which ensures that the throughput for each of the first type guest OSes per unit time is constant in spite of a decrease in CPU frequency, while inhibiting a possible decrease in the number of dispatches for the second type guest OSes. The first modification is different from the above-described embodiment in the scheduling processing.

The scheduling processing according to the first modification will be described below with reference to the flowchart in FIG. 6, focusing on differences from the flowchart in FIG. 4. Steps equivalent to those in the flowchart in FIG. 6 are denoted by the same reference numerals.

Figure 6:
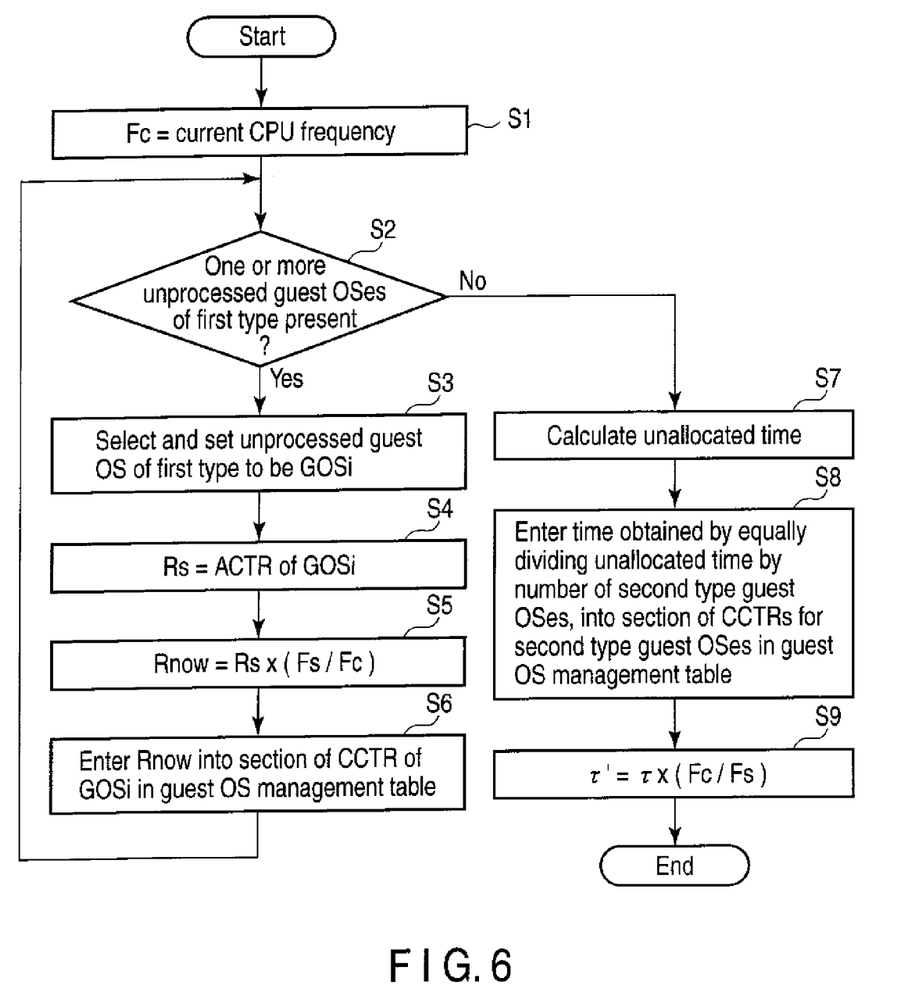
FIG. 6 is a flowchart showing an exemplary procedure of scheduling processing according to a first modification of the embodiment.

The flowchart in FIG. 6 is different from the flowchart in FIG. 4 in the addition of step 9 following step S8. In step S9, the guest OS scheduler 201 changes the quantum, which is the unit of allocation of the CPU time to the guest OSes, in the ratio of the CPU frequency Fc to the prescribed frequency Fs (that is, Fc/Fs). When the value (time) of the quantum at the prescribed frequency Fs is defined as τ, and the new value of the changed quantum is defined as τ', the new quantum value τ' is calculated as follows.

$$\tau' = \tau \times (Fc/Fs) \qquad (2)$$

Thus, if the CPU frequency Fc decreases to, for example, half (500 MHz) of the prescribed frequency Fs (1 GHz), Formula (2) is as follows.

$$\tau' = \tau \times (500 \text{ MHz}/1 \text{ GHz})$$
$$= 0.5\tau$$

The quantum value is halved.

Thus, in the first modification, the quantum value is reduced in accordance with the decrease of the CPU frequency. More specifically, the quantum value is reduced according to the ratio of the CPU frequency Fc to the prescribed frequency Fs. Thus, even with a decrease in the CPU time ratio (CPU throughput) allocated to each of the second type guest OSes 40-3 and 40-4, the number of dispatches can be inhibited from decreasing.

In the above-described example, the CPU frequency Fc decreases to half of the prescribed frequency Fs, the quantum value is reduced from τ to 0.5τ (τ'=0.5τ). As a result, the ratio of the number of quanta per unit time to the number of quanta per unit time used before the change in CPU frequency is doubled compared to that in the above-described embodiment. Specifically, if the CPU time allocated to the second type guest OSes 40-3 and 40-4 decreases from 27.5% to 5%, the ratio increases from 5/27.5 to (5/27.5)×2 (that is, 10/27.5). Thus, the number of dispatches for the second type guest OSes 40-3 and 40-4 can be inhibited from decreasing. The responsiveness of the guest OSes 40-3 and 40-4 can thus be prevented from being degraded.

In the above-described first modification, the guest OS scheduler 201 changes the quantum value such that the quantum value is proportional to the ratio of the CPU frequency Fc to the prescribed frequency Fs (Fc/Fs). However, as described below, the quantum value need not necessarily be proportional to Fc/Fs.

The current CPU time ratio allocated to each of the second type guest OSes if the CPU frequency is equal to the prescribed frequency is called a first CCTR. The current CPU time ratio allocated to each of the second type guest OSes if the CPU frequency is lower than the prescribed frequency is called a second CCTR. The guest OS scheduler 201 may change the quantum value on the basis of the first CCTR and the second CCTR. For example, the guest OS scheduler 201 may change the quantum value such that the quantum value is proportional to the ratio of the second CCTR to the first CCTR.

If the guest OS scheduler 201 thus changes the quantum value, the number of quanta per unit time can be reliably prevented from decreasing for the second type guest OSes (in the above-described example, the guest OSes 40-3 and 40-4). However, excessively reducing the quantum value causes the guest OSes to be frequently switched. This may increase the overhead of switching of the guest OSes, thus degrading the performance of the system. Thus, a lower limit for the quantum value may be preset so as to prevent the quantum value from being set to be smaller than the lower limit value.

Figure 7A:
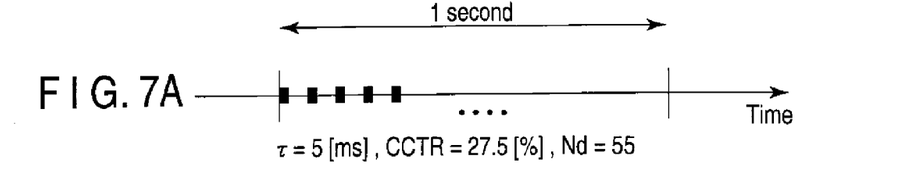
FIGS. 7A to 7C are diagrams showing an example of a second dispatch for a second type guest OS according to the first modification.
Figure 7B:
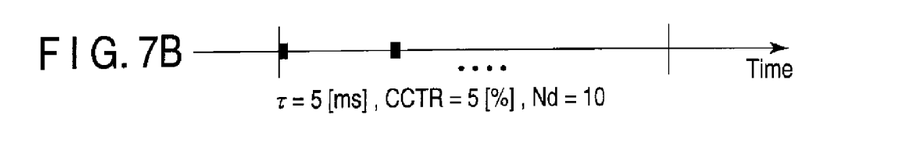
Figure 7C:
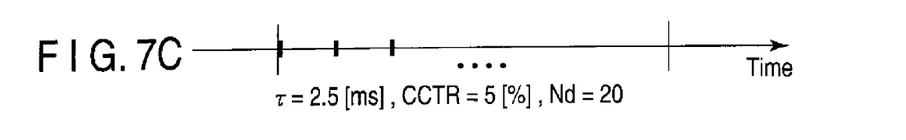

FIGS. 7A to 7C show an example of a dispatch for one of the second type guest OSes, for example, the guest OS 40-3 (#3). The dispatch for the guest OS 40-3 will be described below in detail with reference to FIGS. 7A to 7C.

FIG. 7A shows an example of a dispatch (CPU dispatch) in which in the status of CPU allocation shown in the guest OS management table 202 in FIG. 5, the quantum (CPU 110) is allocated to the guest OS 40-3(#3). As described above, in the status of CPU allocation shown in FIG. 5, the CPU frequency is assumed to be equal to the prescribed frequency. Here, the current CPU time ratio (CCTR) entered into the guest OS management table 202 in association with the guest OS 40-3 (#3) is 27.5%. Thus, in the example in FIG. 7, when the unit time is 1 second and the quantum value is 5 ms (τ=5 ms), 55 quanta are allocated to the guest OS 40-3(#3) per unit time (27.5% of the total number of quanta, 200, per unit time). That is, in the example in FIG. 7A, the number of times (number of dispatches) Nd the quantum (CPU 110) is allocated to the guest OS 40-3(#3) per unit time (1 second) is 55.

FIG. 7B shows an example of a CPU dispatch in which, after the state in FIG. 7A changes to the state in which the CPU frequency is halved (that is, half of the prescribed frequency), with the quantum value remaining unchanged (that is, τ is 5 ms), the quantum (CPU 110) is allocated to the guest OS 40-3(#3). In the status of CPU allocation shown in the guest OS management table 202 in FIG. 2, the CPU frequency is assumed to be half of the prescribed frequency. In the status of CPU allocation shown in FIG. 2, the current CPU time ratio (CCTR) associated with the guest OS 40-3(#3) is 5%. In this case, 10 quanta are allocated to the guest OS 40-3(#3) per unit time (1 second). In this situation, the number of times (number of dispatches) Nd the quantum (CPU 110) is allocated to the guest OS 40-3(#3) per unit time (1 second) is 10, and is clearly smaller than that in the state shown in FIG. 7A. In this case, the responsiveness of the guest OS 40-3(#3) is degraded.

Thus, as is the case with the first modification, the quest OS scheduler 201 changes the quantum value in accordance with the ratio of the CPU frequency Fc to the prescribed frequency Fs (Fc/Fs). Consequently, if the CPU frequency Fc is half (500 MHz) of the prescribed frequency Fs (1 GHz), the quantum value changes from 5 ms to 2.5 ms (τ=2.5 ms). Here, for convenience, the new quantum value is also denoted by τ.

FIG. 7C shows an example of a CPU dispatch performed on the guest OS 40-3(#3) when, in the status of CPU allocation shown in the quest OS management table 202 in FIG. 2, the quantum value is changed to 2.5 ms. Here, the time (τ) for one dispatch is 2.5 ms, but the number of times (number of dispatches) Nd the quantum (CPU 110) is allocated to the guest OS 40-3 (#3) per unit time (1 second) is 20. This indicates that the example in FIG. 7C is improved compared to that in FIG. 7B in terms of the number of dispatches Nd per unit time (in the example in FIG. 7B, the number of dispatches Nd per unit time is 10). That is, in the example in FIG. 7C, compared to the example in FIG. 7B, the processing time for one dispatch is halved, but the dispatch frequency is doubled (dispatch interval is halved). This is expected to improve the responsiveness of the guest OS 40-3(#3).

For example, for a control system that controls a target device by means of polling instead of interruption, the dispatch frequency is important. Therefore, for such a system, increasing dispatch opportunities at the cost of the reduction in quantum value, as in the case of the first modification, contributes to improving the responsiveness.

[Second Modification]

In the above-described embodiment, when a plurality of first type guest OSes are present and if for example, the CPU frequency decreases significantly, the CPU throughput may be insufficient to meet a demand for allocation of the CPU time to all the first type guest OSes. Thus, a mechanism is preferably prepared which allows the system to operate even if the CPU frequency reaches the minimum value assumed for the operation of the system. That is, a mechanism is required which adjusts the allocation of the CPU time to the first type guest OSes so that the absolute CPU time ratios requested by the guest OSes can be provided even if the CPU frequency reaches the minimum value (minimum CPU frequency).

Thus, a second modification of the above-described embodiment which implements such a mechanism will be described. The second modification is characterized in that if a plurality of first type guest OSes are present, a priority can be set for each of the guest OSes so that the absolute CPU time ratio requested by the guest OS can be ensured on the basis of the priority. Such priority enables the specification of the allocation such that guest OSes for which the absolute CPU time ratio is to be ensured even with a sharp decrease in CPU frequency (for example, a decrease to the minimum frequency) are distinguished from guest OSes which have lower priorities but for which the maximum effort is to be made to ensure the absolute CPU time ratio.

Figure 8:
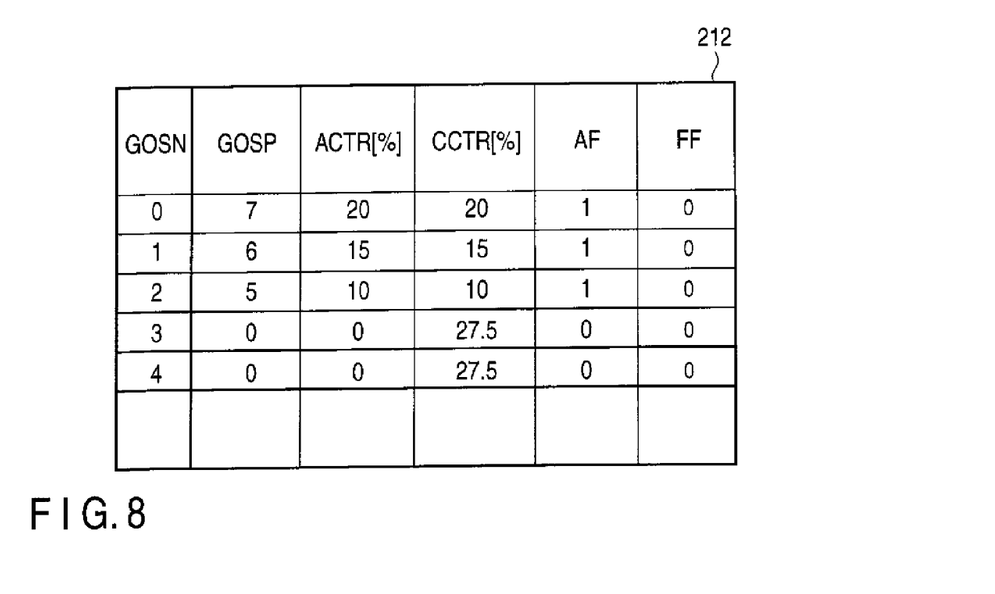
FIG. 8 is a diagram showing an example of a guest OS management table for the case in which the current CPU frequency is equal to the prescribed frequency, the guest OS management table being applied to a second modification of the embodiment.

FIG. 8 shows a guest OS management table 212 applied to the second modification. In the second modification, the guest OS management table 212 is assumed to be used instead of the guest OS management table 202, shown in FIG. 1. The guest OS management table 212 is different from the guest OS management table 202 in that additional items, that is, a guest OS priority (GOSP), an allocation flag (AF), and a failure flag (FF) are associated with the guest OS number GOSN of each of the guest OSes.

The guest OS priority (GOSP) is used to determine the order of the guest OSes in which the guest OS scheduler 201 allocates the absolute CPU time ratio to each guest OS for scheduling. In this example, the guest OS priority has a value of 0 to 7. A guest OS with a larger guest OS priority value is given a higher priority in the allocation of the absolute CPU time ratio.

In the second modification, the guest OS 40-i(#i) (i is one of 0 to 4) requiring setting of the guest OS priority uses the dedicated system call to request VMM 20 to set the guest OS priority. Thus, the second modification provides a system call for invoking the interface (interface function) as follows.

VMM_set_guestos_priority(Priority);
An argument of the interface function is the guest OS priority. When the guest OS 40-i invokes the interface function, a system call to VMM 20 is generated to request the interface to set the guest OS priority. As shown in FIG. 1, the guest OS scheduler 201 has a priority interface module 201b that provides the function of the interface.

When invoked by the system call from the guest OS 40-i using the above-described interface function, the priority interface module 201b of the guest OS scheduler 201 accepts the request for the setting of the guest OS priority indicated by the argument of the interface function. Then, the guest OS scheduler 201 enters the guest OS priority indicated by the argument (that is, the specified value) into the section of the guest OS priority (GOSP) in the guest OS management table 212 in association with the guest OS 40-i (the guest OS number i of the guest OS 40-i).

The allocation flag (AF) indicates that a process of allocating the absolute CPU time ratio has been executed. The failure flag (FF) indicates that, as a result of the scheduling processing, the CPU time has failed to be allocated to the guest OS corresponding to the flag (first type guest OS) in the specified absolute CPU time ratio. With the failure flag set, VMM 20 issues an alarm to the guest OS corresponding to the flag. The alarm is provided, for example, by VMM 20 transmitting a message packet and an interruption to the corresponding guest OS.

The guest OS management table 212 shown in FIG. 8 shows the results of the scheduling obtained when the CPU frequency is equal to the prescribed frequency. In the example in FIG. 8, the first type guest OSes are the guest OSes 40-0 to 40-2, as is the case with the above-described embodiment and the first modification. Here, the CPU time (CPU throughput) is allocated to all the first type guest OSes 40-0 to 40-2 in the requested absolute CPU time ratio.

Figure 9A:
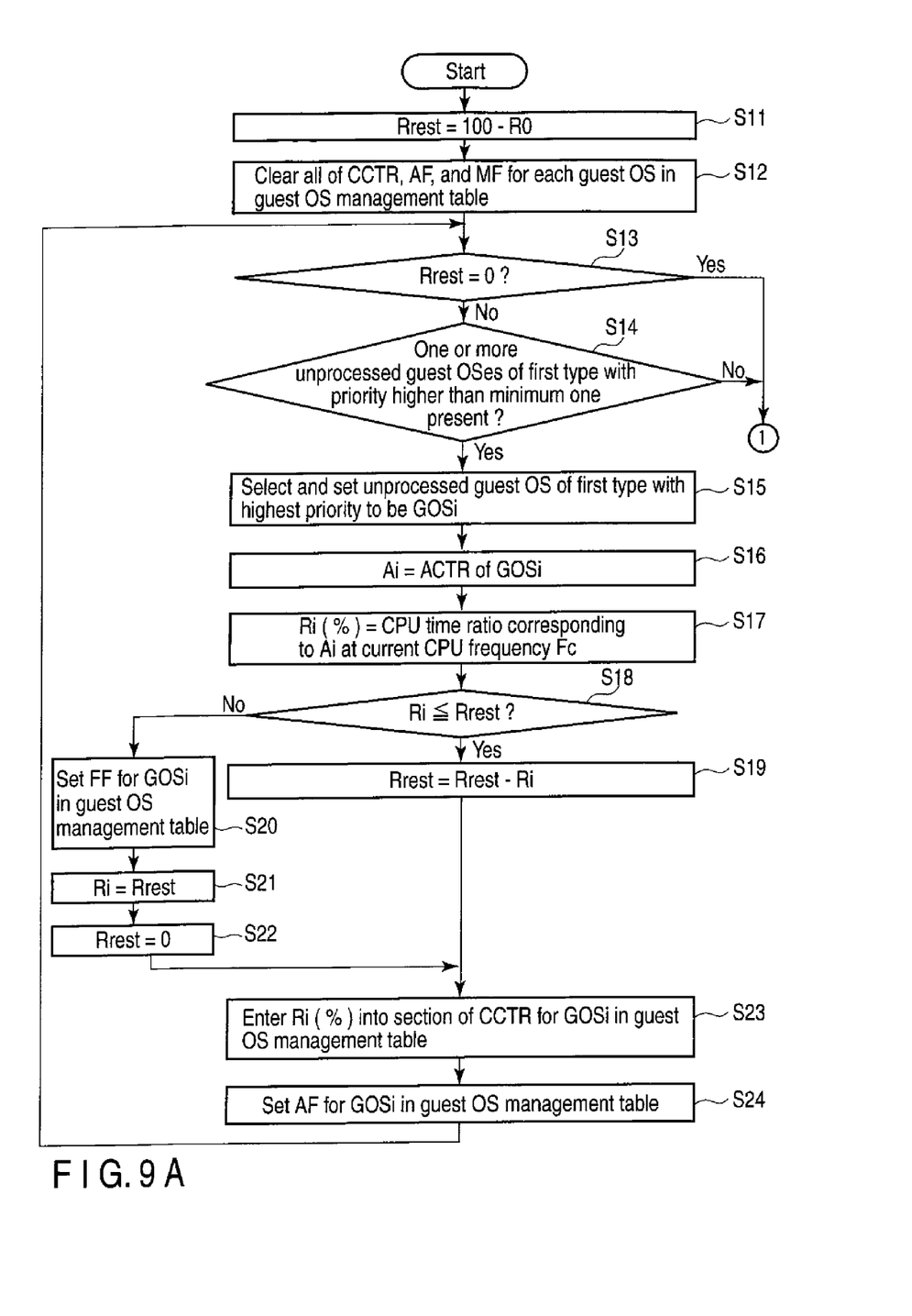
FIG. 9A is a diagram showing an example of scheduling processing executed if the current CPU frequency changes according to the second modification of the embodiment.
Figure 9B:
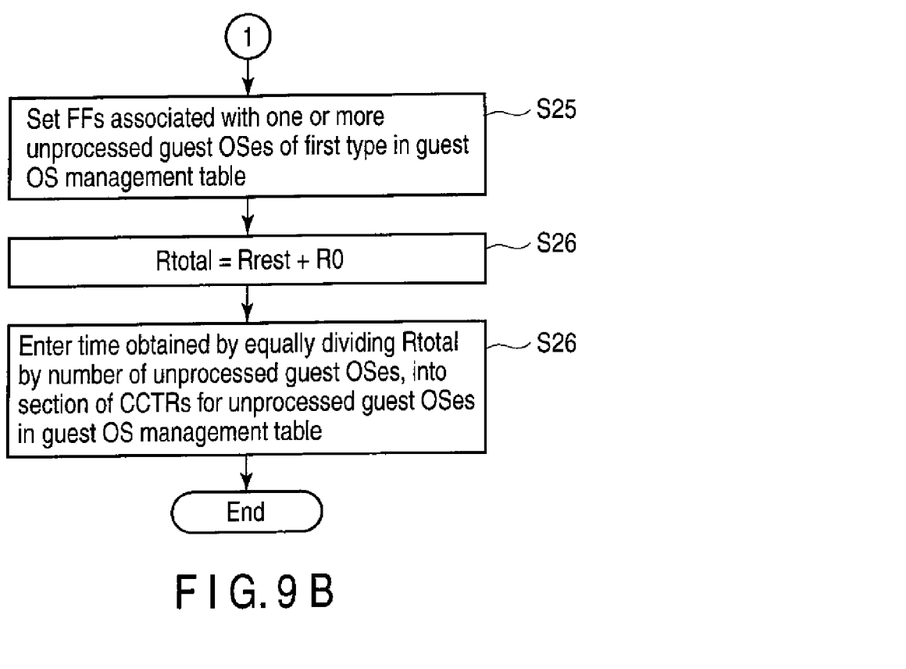
FIG. 9B is a diagram showing an example of scheduling processing executed if the current CPU frequency changes according to the second modification of the embodiment.

With reference to the flowcharts in FIGS. 9A and 9B, the scheduling processing will be described which is executed when in the above-described state, the CPU frequency is half of the prescribed frequency. In FIGS. 9A and 9B, Rrest denotes the CPU time ratio (CPU throughput) that can be allocated to first type guest OSes to which the CPU time ratio (CPU throughput) has not been allocated yet. R0 denotes the minimum CPU time ratio (CPU throughput) required to execute the second type guest OSes. Here, R0 is assumed to be preset to 20%.

First, the guest OS scheduler 201 initializes Rrest (step S11). The initial value of Rrest is equal to 100% minus R0. Thus, R0 indicates the CPU time ratio (CPU throughput) left for the second type guest OSes. Then, the guest OS scheduler 201 clears all of the current CPU time ratio (CCTR), allocation flag (AF), and failure flag (FF) for each of the guest OSes in the guest OS management table 212 (step S12).

Then, the guest OS scheduler 201 determines whether or not Rrest is 0 (step S13). If Rrest is not 0 (if No in step S13), the guest OS scheduler 201 determines that the remaining CPU time ratio (CPU throughput) can be allocated to one or more unprocessed first type guest OSes. The guest OS scheduler 201 thus proceeds to step S14.

In step S14, with reference to the guest OS management table 212, the guest OS scheduler 201 determines whether or not one or more unprocessed first type guest OSes are present which have priorities higher than the minimum one. However, in the second modification, the minimum priority is 0 and is equal to the guest OS priority for the second type guest OSes. Therefore, all the guest OS priorities of the first type guest OSes are higher than the minimum priority.

If one or more first type guest OSes as described above are present (if Yes in step S14), the guest OS scheduler 201 selects and sets an unprocessed first type guest OS with the highest guest OS priority to be GOSi (step S15).

The guest OS scheduler 201 acquires the absolute CPU time ratio (ACTR) of the selected first type guest OS (that is, GOSi) from the guest OS management table 212 and sets the absolute CPU time ratio (ACTR) to be Ai (step S16). Then, the guest OS scheduler 201 determines and sets the CPU time ratio (CPU throughput) corresponding to Ai at the current CPU frequency Fc, to be Ri [%] (step S17). Here, Ri corresponds to Rnow in the above-described embodiment. As in the case of step S4 in the flowchart in FIG. 4 or 5, Ri is calculated on the basis of the absolute CPU time ratio (ACTR) specified for GOSi, the current CPU frequency Fc, and the prescribed frequency Fs.

Then, the guest OS scheduler 201 determines whether or not Ri is equal to or lower than Rrest (unprocessed CPU time ratio) (step S18). If Ri is equal to or lower than Rrest (if Yes in step S18), the guest OS scheduler 201 determines that Ri can be allocated to GOSi. In this case, the guest OS scheduler 201 subtracts Ri from Rrest to obtain a new Rrest (step S19). The guest OS scheduler 201 further enters Ri into the section of the current CPU time ratio (CCTR) associated with GOSi in the guest OS management table 212 (step S23). That is, the guest OS scheduler 201 allocates Ri to GOSi.

In contrast, If Ri is higher than Rrest (if No in step S18), the guest OS scheduler 201 determines that only a part of Ri can be allocated to GOSi. In this case, the guest OS scheduler 201 executes step S20 described below. Then, to allocate the whole Rrest to GOSi, the guest OS scheduler 201 changes Ri to Rrest (step S21) and sets Rrest to 0 (step S22). Step S22 is equivalent to subtraction of Rrest from Rrest to obtain a new Rrest. The guest OS scheduler 201 then enters Ri changed in step S21 into the section of the current CPU time ratio (CCTR) associated with GOSi in the guest OS management table 212 (step S23). That is, the guest OS scheduler 201 allocates the whole Rrest obtained during the execution of step S18 to GOSi as Ri.

Furthermore, since the absolute CPU time ratio requested by GOSi cannot be allocated to GOSi, the guest OS scheduler 201, for example, executes step S20 before the above-described step S21 in order to issue an alarm later to GOSi. In step S20, the guest OS scheduler 201 sets 1 in the section of the failure flag (FF) associated with GOSi in the guest OS management table 212 (step S20). That is, the guest OS scheduler 201 sets the failure flag associated with GOSi in the guest OS management table 212.

Upon executing the above-described step 223, the guest OS scheduler 201 sets 1 in the section of the allocation flag (AF) associated with GOSi in the guest OS management table 212 in order to record that the current CPU time ratio (CPU throughput) has been allocated to GOSi (step S24).

The guest OS scheduler 201 repeats the above-described processing until Rrest reaches 0 or no unprocessed first type guest OS with a priority higher than the minimum one is present (steps S13 and S14). Then, if Rreset reaches 0 (if Yes in step S13) or if no unprocessed first type guest OS with a priority higher than the minimum one is present (if No in step S14), the guest OS scheduler 201 proceeds to step S25. Now, one or more unprocessed first type guest OSes (to which the CPU time ratio has not been allocated yet) are assumed to remain. In this case, the guest OS scheduler 201 executes step S25 to set the failure flags (FFs) associated with the one or more unprocessed first type guest OSes in the guest OS management table 212.

The guest OS scheduler 201 adds Rrest and R0 together to calculate unallocated time (unallocated CPU time ratio) Rtotal including R0 (Rtotal=Rrest+R0) (step S26). The guest OS scheduler 201 equally divides the unallocated time Rtotal by the number N of all the unprocessed guest OSes (Rtotal/N) (step S27). All the unprocessed guest OSes include one or more unprocessed first type guest OSes and/or one or more unprocessed second type guest OSes. In the above-described step S27, the guest OS scheduler 201 enters the time Rtotal/N resulting from the equal division into the section of the current CPU time ratio (CCTR) associated with each of the unprocessed guest OSes in the guest OS management table 212 (step S27).

Figure 10:
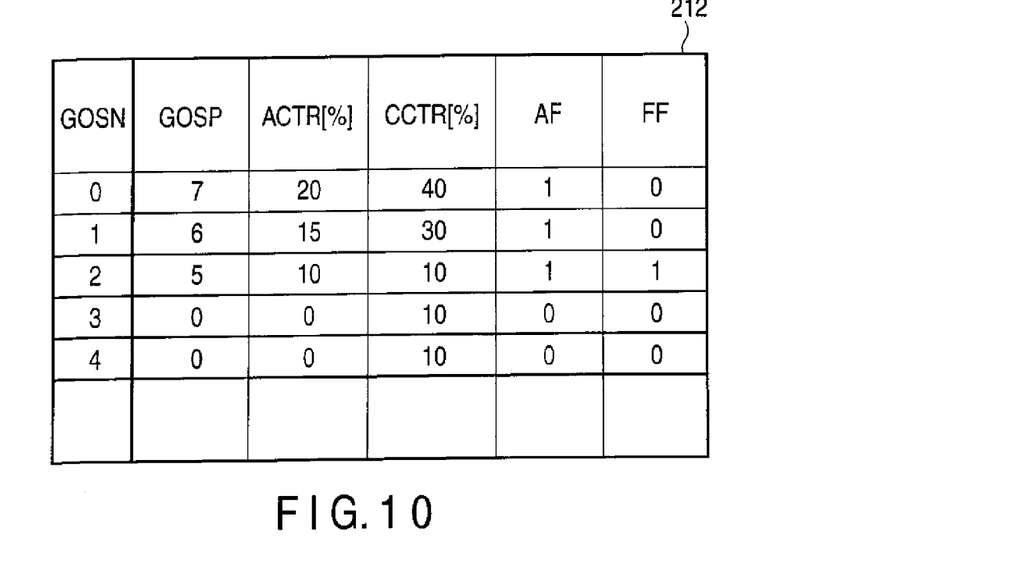
FIG. 10 is a diagram showing an exemplary state of a guest OS management table resulting from scheduling processing according to the flowchart in FIGS. 9A and 9B executed when the guest OS management table is as shown in FIG. 8.

If the scheduling processing according to the flowcharts in FIGS. 9A and 9B is executed when the guest OS management table 212 is as shown in FIG. 8, the guest OS management table 212 is as shown in FIG. 10. In the example in the guest OS management table 212 in FIG. 10, to those of the first type guest OSes 40-0(#0) to 40-2(#2) which have higher guest OS priorities, that is, the guest OSes 40-0(#0) and 40-1(#1), the CPU time ratios (CPU throughputs) (CCTR) of 40% and 30%, ensuring the absolute CPU time ratios (ACTRs) of 20% and 15%, respectively, requested by the guest OSes 40-0(#0) and 40-1(#1), are allocated.

In contrast, instead of the CPU time ratio (CPU throughput) (CCTR) of 20%, required to ensure the absolute CPU time ratio (ACTR) of 10%, requested by the guest OS 40-2 (#2), having a lower guest OS priority than the guest OSes 40-0(#0) and 40-1(#1), a lower CPU time ratio of 10% is allocated to the guest OS 40-2(#2). Thus, the failure flag (FF) is set in association with the guest OS 40-2. The dispatcher 203 sends an alarm message to the guest OS 40-2 on the basis of the failure flag.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A virtual computer system, comprising:
hardware including a CPU; and
a virtual machine manager configured to virtualize the hardware to construct a plurality of virtual machines and to manage the plurality of virtual machines such that the plurality of virtual machines execute a plurality of guest OSes,
wherein the virtual machine manager includes:
a detector configured to detect a change in an operating frequency of the CPU;
a scheduler configured to manage a schedule for allocating the CPU to the plurality of guest OSes in a time-sharing manner, the scheduler being configured such that if the detector detects a change in the operating frequency and the operating frequency decreases below a predetermined prescribed frequency, the scheduler increases a time for which the CPU is to be allocated to one or more predetermined particular quest OSes of the plurality of guest OSes; and
a dispatcher configured to allocate the CPU to the plurality of guest OSes in a time-sharing manner according to the schedule managed by the scheduler;
wherein:
the scheduler is configured to increase the time for which the CPU is to be allocated to the one or more particular guest OSes so that the CPU is allocated to the one or more particular guest OSes for a time required to maintain an absolute throughput corresponding to a processing capability of the CPU required by the one or more particular guest OSes to operate at the prescribed frequency, and
the scheduler is configured such that when the prescribed frequency is defined as Fs, the operating frequency is defined as Fc, and the absolute throughput is defined as Rs, the scheduler determines a time corresponding to a throughput indicated by "Rs×(Fs/Fc)" to be the time required to maintain the absolute throughput.

2. The virtual computer system according to claim 1, wherein:
the scheduler subtracts a second time for which the CPU is allocated to the one or more particular guest OSes from a first time for which the CPU is allowed to be allocated to the plurality of guest OSes to calculate an unallocated time for which the CPU is allowed to be allocated to remaining quest OSes which are all the plurality of guest OSes other than the one or more particular guest OSes, and the scheduler is configured to adjust the schedule so that the CPU is equally allocated to the remaining guest OSes for the calculated unallocated time.

3. The virtual computer system according to claim 2, wherein the scheduler is configured to, when adjusting the schedule so as to increase the time for which the CPU is to be allocated to the one or more particular guest OSes, reduce a magnitude of a unit of time for which the CPU is allocated to the plurality of guest OSes.

4. The virtual computer system according to claim 3, wherein the scheduler is configured so that when the unit of time used if the operating frequency Fc is equal to the prescribed frequency Fs is defined as τ, the scheduler changes the magnitude of the unit of time from the τ to "τ×(Fc/Fs)".

5. A virtual computer system, comprising:
hardware including a CPU; and
a virtual machine manager configured to virtualize the hardware to construct a plurality of virtual machines and to manage the plurality of virtual machines such that the plurality of virtual machines execute a plurality of guest OSes,
wherein the virtual machine manager includes:
a detector configured to detect a change in an operating frequency of the CPU;
a scheduler configured to manage a schedule for allocating the CPU to the plurality of quest OSes in a time-sharing manner, the scheduler being configured such that if the detector detects a change in the operating frequency and the operating frequency decreases below a predetermined prescribed frequency, the scheduler increases a time for which the CPU is to be allocated to one or more predetermined particular guest OSes of the plurality of guest OSes; and
a dispatcher configured to allocate the CPU to the plurality of guest OSes in a time-sharing manner according to the schedule managed by the scheduler;
wherein:
the scheduler is configured to increase the time for which the CPU is to be allocated to the one or more particular guest OSes so that the CPU is allocated to the one or more particular guest OSes for a time required to maintain an absolute throughput corresponding to a processing capability of the CPU required by the one or more particular guest OSes to operate at the prescribed frequency,
the virtual machine manager includes an allocation interface module configured to accept an allocation request for allocation of the absolute throughput which is issued by the one or more particular guest OSes, and
the scheduler is configured such that if the allocation interface module accepts the allocation request, the scheduler determines, for management, the absolute throughput indicated by the allocation request to be the processing capability of the CPU required by the one or more particular guest OSes to operate at the prescribed frequency.

6. The virtual computer system according to claim 5, wherein:
the virtual machine manager includes a priority interface module configured to accept a setting request for setting of a priority which is issued by the one or more particular guest OSes, the priority indicating a priority used to ensure the absolute throughput required by the one or more particular guest OSes,
the scheduler is configured to manage the priority indicated by the setting request from the one or more particular guest OSes which has been accepted by the priority interface module, as a priority for the one or more particular guest OSes, and
the scheduler is configured such that if the operating frequency decreases below the prescribed frequency, the scheduler adjusts the schedule so as to maintain the absolute throughput required by the one or more particular guest OSes, in accordance with the priority for the one or more particular guest OSes.

7. A method of adjusting a schedule for allocating CPU to a plurality of guest OSes in a virtual computer system in a time-sharing manner, the method comprising:
detecting that an operating frequency of the CPU has decreased below a predetermined prescribed frequency;
if a decrease in the operating frequency below the predetermined prescribed frequency is detected, adjusting the schedule so as to increase a time for which the CPU is allocated to one or more predetermined particular guest OSes of the plurality of guest OSes; and
allocating the CPU to the plurality of guest OSes in a time-sharing manner according to the schedule,
wherein the time for which the CPU is to be allocated to the one or more particular guest OSes is a time required to maintain an absolute throughput corresponding to a processing capability of the CPU required by the one or more particular guest OSes to operate at the prescribed frequency,
wherein the adjusting includes:
when the prescribed frequency is defined as Fs, the operating frequency is defined as Fc, and the absolute throughput is defined as Rs, calculating a throughput indicated by "Rs×(Fs/Fc)"; and
determining a time corresponding to the calculated throughput to be the time required to maintain the absolute throughput.

8. The method according to claim 7, wherein:
the adjusting further includes calculating an unallocated time for which the CPU is allowed to be allocated to remaining guest OSes which are all the plurality of guest OSes other than the one or more particular guest OSes, the unallocated time being calculated by subtracting a second time for which the CPU is allocated to the one or more particular quest OSes from a first time for which the CPU is allowed to be allocated to the plurality of guest OSes; and
in the adjusting, the schedule is adjusted such that the CPU is equally allocated to the remaining guest OSes for the calculated unallocated time.

9. The method according to claim 8, wherein the adjusting further includes, when adjusting the schedule so as to increase the time for which the CPU is to be allocated to the one or more particular guest OSes, reducing a magnitude of a unit of time for which the CPU is allocated to the plurality of guest OSes.

10. The method according to claim 9, wherein when the unit of time used if the operating frequency Fc is equal to the prescribed frequency Fs is defined as τ, in the reducing, the magnitude of the unit of time is changed from the τ to "τ×(Fc/Fs)".

11. A method of adjusting a schedule for allocating CPU to a plurality of guest OSes in a virtual computer system in a time-sharing manner, the method comprising:
detecting that an operating frequency of the CPU has decreased below a predetermined prescribed frequency;
if a decrease in the operating frequency below the predetermined prescribed frequency is detected, adjusting the schedule so as to increase a time for which the CPU is allocated to one or more predetermined particular guest OSes of the plurality of guest OSes;

allocating the CPU to the plurality of guest OSes in a time-sharing manner according to the schedule, wherein the time for which the CPU is to be allocated to the one or more particular quest OSes is a time required to maintain an absolute throughput corresponding to a processing capability of the CPU required by the one or more particular guest OSes to operate at the prescribed frequency;

accepting an allocation request for allocation of the absolute throughput which is issued by the one or more particular guest OSes; and determining the absolute throughput indicated by the allocation request to be the processing capability of the CPU required by the one or more particular guest OSes to operate at the prescribed frequency, and entering the absolute throughput into a management table in association with the one or more particular guest OSes.

12. The method according to claim 11, further comprising:

accepting a setting request for setting of a priority which is issued by the one or more particular guest OSes, the priority indicating a priority used to ensure the absolute throughput required by the one or more particular guest OSes; and determining the priority indicated by the accepted setting request from the one or more particular guest OSes to be a priority for the one or more particular guest OSes, and entering the priority into the management table in association with the one or more particular guest OSes, wherein in the adjusting, the schedule is adjusted so as to maintain the absolute throughput required by the one or more particular guest OSes, in accordance with the priority for the one or more particular guest OSes.

* * * * *

UNITED STATES PATENT AND TRADEMARK OFFICE
CERTIFICATE OF CORRECTION

| | |
|---|---|
| PATENT NO. | : 8,291,413 B2 |
| APPLICATION NO. | : 12/261901 |
| DATED | : October 16, 2012 |
| INVENTOR(S) | : Mizuno |

It is certified that error appears in the above-identified patent and that said Letters Patent is hereby corrected as shown below:

\* Column 2, line 38, change "quest" to --guest--.

\* Column 5, line 15, change "quest" to --guest--.

\* Column 5, line 24, change "quest" to --guest--.

\* Column 8, line 35, change "quest" to --guest--.

\* Column 8, line 40, change "quest" to --guest--.

\* Column 9, line 17, change "quest" to --guest--.

\* Column 10, line 19, change "quest" to --guest--.

\* Column 12, line 37, change "quest" to --guest--.

\* Column 12, line 46, change "quest" to --guest--.

\* Claim 1, column 16, line 38, change "quest" to --guest--.

\* Claim 2, column 16, line 65, change "quest" to --guest--.

\* Claim 5, column 17, line 27, change "quest" to --guest--.

\* Claim 8, column 18, line 43, change "quest" to --guest--.

\* Claim 11, column 19, line 6, change "quest" to --guest--.

Signed and Sealed this
Twenty-second Day of January, 2013

David J. Kappos
*Director of the United States Patent and Trademark Office*